(12) United States Patent
Takahashi et al.

(10) Patent No.: US 6,424,795 B1
(45) Date of Patent: Jul. 23, 2002

(54) METHOD AND APPARATUS FOR RECORDING AND REPRODUCING VIDEO DATA, AND RECORDING MEDIUM

(75) Inventors: Masaru Takahashi, Yokohama; Junji Shiokawa, Chigasaki, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/446,338

(22) PCT Filed: Sep. 20, 1999

(86) PCT No.: PCT/JP99/05107

§ 371 (c)(1),
(2), (4) Date: Dec. 20, 1999

(87) PCT Pub. No.: WO01/03431

PCT Pub. Date: Nov. 1, 2001

(30) Foreign Application Priority Data

Jul. 5, 1999 (JP) .......................................... 11-189868

(51) Int. Cl.⁷ ............................ H04N 5/91; H04N 5/225
(52) U.S. Cl. ....................... 386/120; 336/117; 348/220; 348/232
(58) Field of Search ............................ 386/46, 109, 111, 386/112, 117, 118, 120, 121, 124, 125, 126, 131, 104, 98; 348/220, 232, 233; 382/236; H04N 5/225, 5/91

(56) References Cited

U.S. PATENT DOCUMENTS

| | | | | |
|---|---|---|---|---|
| 4,691,253 A | * | 9/1987 | Silver | 386/118 |
| 5,138,459 A | * | 8/1992 | Roberts et al. | 348/232 |
| 5,444,482 A | * | 8/1995 | Misawa et al. | 386/120 |
| 5,987,179 A | * | 11/1999 | Riek et al. | 382/236 |
| 6,195,503 B1 | * | 2/2001 | Ikedo et al. | 386/104 |
| 6,226,449 B1 | * | 5/2001 | Inoue et al. | 386/120 |
| 6,300,976 B1 | * | 10/2001 | Fukuoka | 348/232 |

FOREIGN PATENT DOCUMENTS

| | | | | |
|---|---|---|---|---|
| JP | 7-212712 | | 8/1995 | |
| JP | 7-327196 | | 12/1995 | |
| JP | 10108121 | * | 4/1998 | ............ H04N/5/91 |
| JP | 10200859 | * | 7/1998 | ............ H04N/5/92 |
| WO | WO 92/09169 | * | 5/1992 | ............ H04N/5/30 |

OTHER PUBLICATIONS

Japanese Patent Abstract No. 10108133 (1998).
Japanese Patent Abstract No. 10233995 (1998).
"HDTV MPEG2" pp. 128–164.

* cited by examiner

Primary Examiner—Vincent Boccio
(74) Attorney, Agent, or Firm—Antonelli, Terry, Stout & Kraus, LLP

(57) ABSTRACT

A video recording apparatus allowing any of recordable players and other ordinary players that reproduce MPEG moving pictures to reproduce still pictures when in reproducing photographed still pictures and preferred to record fine still pictures.

When recording still pictures, the video recording apparatus records still pictures encoded by the still picture encoding means (106) and other still pictures encoded by the moving picture encoding means (105) from single frame signals. The single frame signals are created by the signal converting means (109) from the still pictures encoded by the still picture encoding means (106).

16 Claims, 3 Drawing Sheets

METHOD AND APPARATUS FOR RECORDING AND REPRODUCING VIDEO DATA, AND RECORDING MEDIUM

FIELD OF THE INVENTION

The present invention relates to an apparatus and a method for recording moving and still pictures, and an apparatus and a method for reproducing recorded moving and still pictures, as well as a recording medium.

BACKGROUND ART

Recently, along with tendency toward large scale in capacity of recording medium such as rewritable optical disks, etc. and with improvement in techniques for compressing moving pictures, the techniques for digital cameras and recordable players, etc. that have the function of recording moving pictures on optical disks have been reviewed. Under the situation, recordings of both moving and still pictures on optical disks in a common format have coming into reality.

As such a compression method, it would be advantageous to use the MPEG (Moving Picture Expert Group) standard for recording moving pictures from the viewpoint of compression efficiency. The MPEG standard is a well-known technique described in, for example, "The Latest Guidebook to MPEG" (ASCII Co., Ltd., Aug. 1, 1994), etc. The detailed description for the MPEG will thus be omitted here.

As for a compression method for still pictures, the JPEG (Joint Photographic coding Experts Group) standard used for recording digital still pictures from general electronic still cameras may be replaced with another method if the method can record the data equivalent to one frame of moving pictures recorded by the MPEG as I picture. If the recordable player described above has a means for expanding pictures compressed by, for example, the MPEG compression method, and then both moving and still pictures can be reproduced. In this case, it is no need to use such an expanding means as JPEG for reproducing pictures, thereby the cost of the reproducing system can be reduced.

However, the data must be processed fast to encode moving pictures in real time and it is impossible to increase the number of pixels per frame of moving pictures so much. For example, the maximum number of pixels per frame is 720 in the horizontal direction and 480 in the vertical direction on the encoding level referred to as the main profile main level which handles the resolution of the present TV sets, required for the MPEG method. On the other hand, the encoding time for one sheet of still pictures is not limited so strictly, so that the number of pixels to be handled in accordance with the high resolution of the object photographing element can be increased. Consequently, most of the present electronic still cameras can record still pictures with the use of the JPEG compression method and the number of pixels to be handled by those cameras is being increased year after year.

In order to enable any reproducing apparatus such as recordable players and ordinary players to reproduce data on the basis of the MPEG, as well as record high resolution still pictures, it is only needed to record both MPEG I pictures and JPEG file pictures. Such techniques are disclosed in, for example, the Japanese Patent Unexamined Publication No. 10-108133. According to the disclosed techniques, pictures is encoded and recorded with a plurality of different methods at a time and both moving and still pictures are encoded and recorded simultaneously. The conventional techniques, however, do not consider encoding of still pictures read from a fine photographing element with the use of such an encoding method as MPEG for moving pictures. In particular, no care is paid for the difference in reading pictures from a photographing element between reading fine still pictures and reading moving pictures.

Furthermore, the above conventional techniques do not consider any correspondence to recordings of both moving and still pictures, although they can record both encoded still pictures and partial still pictures so as to make it easier for an user to control the apparatus, for example, for searching pictures when in reproducing.

DISCLOSURE OF THE INVENTION

Generally, the number of pixels to be read from a photographing element within a unit time is limited. The number of pixels to be read per frame of moving pictures therefore is also limited. On the other hand, a long time can be spared to read a large number of pixels from still pictures slowly. Consequently, if an apparatus that employs a fine photographing element is used to record fine still pictures, a sheet of pictures is read by spending a time required for reading one or more frames. The reading method thus comes to differ between moving picture and still pictures.

Under the circumstances, it is the first object of the present invention to provide an apparatus and a method for recording pictures, which are preferred to solve the above conventional problems and enable recordable players and other ordinary players which reproduce moving pictures to reproduce and record fine still pictures, as well.

It is the second object of the present invention to provide an apparatus and a method for recording pictures, which is more improved in controlling such reproducing operations as searching even when in recording both moving and still pictures, as well as a recording medium in which pictures are recorded as described above.

Furthermore, it is the third object of the present invention to provide an apparatus and a method for reproducing both moving and still pictures, which can reproduce the recording medium on which pictures are recorded with the use of the recording apparatus and the recording method described above, as well as improved more in controlling such reproducing operations as searching and composed simply.

In order to achieve the first object, the recording method of the present invention used for a video recording apparatus that can record both moving and still pictures on a recording medium includes steps for recording moving pictures encoded with the use of the first encoding method when in recording moving pictures; and for recording still pictures encoded with the use of the second encoding method and other still pictures encoded by the first encoding method from single frame signals obtained from the still pictures when in recording still pictures. Furthermore, the video recording apparatus of the present invention comprises optical focusing means composed of an optical lens system; photoelectric converting means for converting pictures focused by the optical focusing means to electric signals; signal processing means for converting electric signals converted by the photoelectric converting means to video signals; driving means provided with two modes (moving picture photographing mode and still picture photographing mode) so as to drive reading of electric signals from the photoelectric converting means so that the video signals are converted to predetermined moving picture signals in the moving photographing mode and drive reading of electric signals from the photoelectric converting means so that the video signals are converted to video signals finer than the moving picture signals in the still picture photographing mode; signal converting means for converting the signal format of fine video signals in the still picture photographing mode to the same format as that of single frame moving picture signals in the moving picture photographing mode; moving picture encoding means for encoding moving picture signals output from the signal processing means with the use of the first encoding method in the moving picture photographing mode and encoding single frame signals output from the signal converting means with the use of the first encoding method in the still picture photographing mode; still picture encoding means for encoding fine video signals with the use of the second encoding method in the still picture photographing mode; recording controlling means for controlling a recording medium for recording encoded moving and still pictures and recording of moving and still pictures on the recording medium; system controlling means for controlling each of the above means one-dimensionally; and selecting means for selecting one of the recording modes. The recording apparatus can thus record moving images encoded by the moving encoding means when in recording moving pictures and record still pictures encoded by the still picture encoding means, as well as other still pictures encoded by the moving encoding means from single frame signals obtained from the still pictures when in recording still pictures.

The video recording apparatus of the present invention further includes moving picture storing means for storing single frame signals output from the signal converting means in the still picture photographing mode; and still picture storing means for storing fine video signals so that the recording apparatus records moving pictures by reading moving picture signals from the moving picture storing means and encoding them with the use of the moving picture encoding means when in recording moving pictures and records still pictures by reading still pictures from the fine still picture storing means and encoding them with the use of the still picture encoding means when in recording still pictures, and also records fine video signals read from the moving picture storing means and encoded by the moving picture encoding means. The fine video signals are stored once in the still picture storing means before they are converted to single frame signals by the signal converting means, then stored in the moving picture storing means.

In order to achieve the second object of the present invention, the present invention provides a recording method characterized in that when in recording moving pictures, moving pictures are recorded together with a still picture obtained by compressing signals of a frame representing the moving pictures to record and when in recording still pictures, compressed still pictures are also recorded together with non-compressed still pictures. The recording method also employs screen compressing means for compressing the screen of pictures of a frame representing the moving picture signals to record when in recording moving pictures and compressing the screen of still pictures to record when in recording still pictures, so that when in recording of moving pictures, moving pictures encoded by the moving encoding means are recorded together with still pictures whose screen is compressed by the screen compressing means and when in recording of still pictures, still pictures encoded by the still picture encoding means are recorded together with other still pictures encoded by the moving encoding means from single frame signals obtained from the still pictures, and further other still pictures whose screen is compressed by the screen compressing means.

Furthermore, the present invention provides the recording method characterized in that when in recording of moving pictures, moving pictures are recorded together with a still picture obtained by compressing the signals of a frame representing the moving pictures to record and when in recording of still pictures, still pictures obtained by compressing the single frame signals to be encoded by the first encoding method is also recorded. The video recording apparatus further includes screen compressing means for compressing the screen of pictures of a frame representing moving picture signals to record when in recording moving pictures and compressing the screen of single frame signals obtained from the still pictures when in recording still pictures, so that when in recording moving pictures, the moving pictures encoded by the moving picture encoding means are recorded together with the still pictures whose screen is compressed by the screen compressing means and when in recording still pictures, the still pictures encoded by the still picture encoding means are recorded together with still pictures encoded by the moving picture encoding means from single frame signals obtained from the still pictures, as well as other still pictures whose screen is compressed by the screen compressing means.

The present invention also provides a recording method for recording a still picture obtained by compressing signals of a frame representing the moving pictures to record when in recording moving pictures and recording either compressed still pictures or still pictures obtained by compressing single frame signals to be encoded by the first encoding method. In this case, the video recording apparatus of the present invention further includes screen compressing means for compressing the screen of pictures of a frame representing the object moving picture signals when in recording moving pictures and compressing the screen of either the still pictures or single frame signals obtained from the still pictures when in recording still pictures, so that when in recording moving pictures, moving pictures encoded by the moving picture encoding means are recorded together with still pictures whose screen is compressed by the screen compressing means and when in recording still pictures, still pictures encoded by the still picture encoding means are recorded together with other still pictures encoded by the moving picture encoding means from single frame signals obtained from the same still pictures, and further other still pictures whose screen is compressed by the screen compressing means.

Furthermore, the present invention further provides a recording medium on which moving pictures encoded by the first encoding means are recorded together with still pictures obtained by compressing the screen of a representative one of the moving pictures, other still pictures encoded by the second encoding method, single frame moving pictures created from the still pictures encoded by the first encoding method, and further other still pictures whose screen is compressed.

In order to achieve the third object of the present invention, the present invention provides a reproducing method that can reproduce the above recording medium, wherein it is possible to reproduce and output single frame moving pictures created from the still pictures encoded by the first encoding method corresponding to the selected still picture to at least one output destination when a still picture whose screen is compressed is selected and called. In this case, the reproducing method allows a still picture corresponding to the called still picture to be output in accordance with the picture resolution of the output destination. Furthermore, the video reproducing apparatus of the present invention further includes picture selecting means for specifying one of reproduced still pictures whose screen is compressed; reproducing controlling means for controlling reproduction of single frame moving pictures created from still pictured encoded by the first encoding method corresponding to the selected still picture when the selected still picture in a still picture whose screen is compressed: moving picture decoding means for decoding reproduced single frame moving pictures using the first encoding method.

Furthermore, the present invention provides a reproducing method used for a video reproducing apparatus that can reproduce the above recording medium, wherein a single frame moving picture created from a still picture encoded by the first encoding method corresponding to a selected still picture to reproduced and displayed when a still picture whose screen Is compressed is selected and called. In this case, the reproducing apparatus that uses the above reproducing method is further provided with picture selecting means for specifying one of reproduced still pictures whose screen is compressed; reproducing control means for reproducing single frame moving pictures created from the still pictures encoded by the first controlling means corresponding to the selected still picture when the selected still picture is a still picture whose screen is compressed; moving picture decoding means for decoding the reproduced single frame moving pictures using the first encoding method; and displaying means for displaying decoded single frame moving pictures.

BEST MODE FOR CARRYING OUT THE INVENTION

Hereunder, the embodiments of the present invention will be described with reference to the accompanying drawings.

First Embodiment

Figure 1:
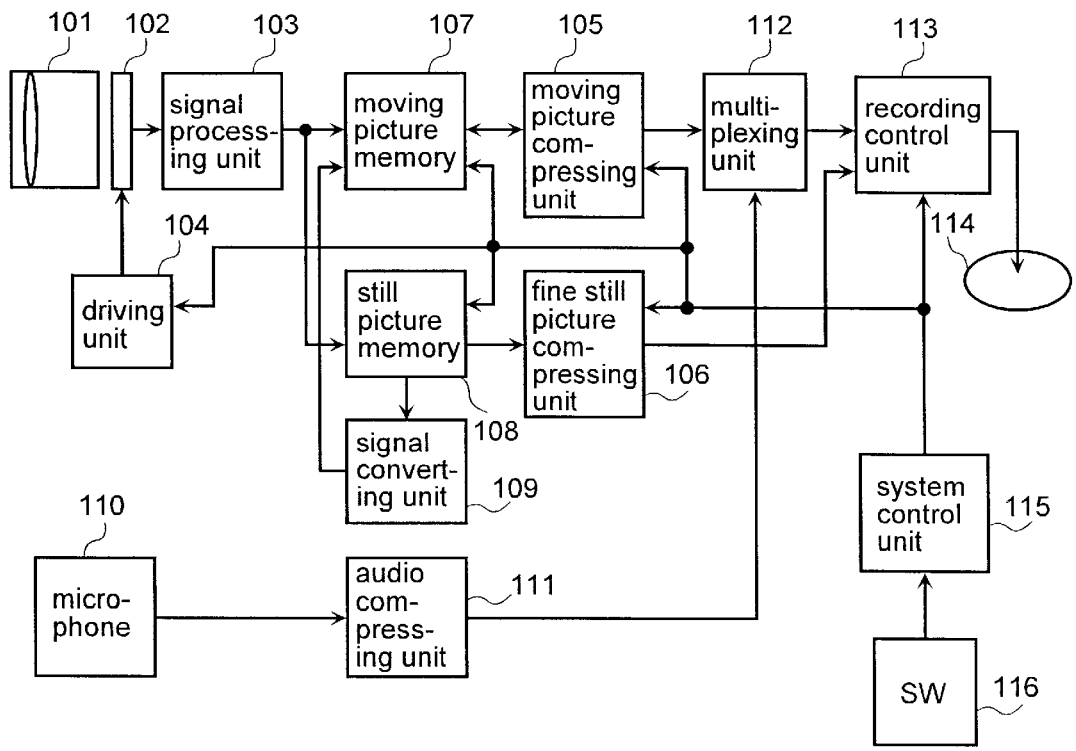
FIG. 1 is a system block diagram of a recording apparatus united with a camera in an embodiment of a video recording apparatus of the present invention.

FIG. 1 is a system block diagram indicating a video recording apparatus united with a camera in an embodiment of the present invention. In FIG. 1, numeral 101 is an optical lens for focusing an object picture and 102 is a CCD sensor, which is photoelectric converting means for converting the light of focused pictures to electric signals. Numeral 103 is a signal processing unit for converting picture information converted to electric signals further to video signals and 104 is a driving unit for driving the CCD sensor. Numeral 105 is a moving picture compressing unit for compressing video signals in accordance with such an encoding standard as MPEG used for moving pictures. Numeral 106 is a fine still picture compressing unit for compressing video signals in accordance with such an encoding standard as JPEG used for fine still pictures and 107 is a moving picture memory for storing pictures temporarily when the moving picture compressing unit 105 performs a compression processing. Numeral 108 is a still picture memory for storing pictures temporarily when the fine still picture compressing unit 106 performs a compressing processing. Numeral 109 is a signal converting unit for converting the signal format of fine still signals to the same signal format as that of single frame moving picture signals. Numeral 110 is a microphone for converting collected audios to electric audio signals and 111 is an audio compressing unit for converting audio signals to digital signals and compressing predetermined digital audios. Numeral 112 is a multiplexing unit for multiplexing compressed moving picture streams generated in the moving picture compressing unit 105 and compressed audio streams generated in the audio compressing unit 111. Numeral 113 is a recording control unit for managing recorded data files of moving and still pictures to record and controlling the recording with the use of a predetermined file system. Numeral 114 is such a recording medium as an optical disk, etc. Numeral 115 is a system control unit for controlling the driving unit 104, the moving picture compressing unit 105, the fine still picture compressing unit 106, the moving picture memory 107, the still picture memory 108, and the recording control unit 113 one-dimensionally. Numeral 116 is a switch used by the user to select a recording mode between the moving picture photographing mode and the still picture photographing mode.

If the moving picture photographing mode is selected by the switch 116, the system control unit 115 controls the whole system as follows. The driving unit 104 drives the CCD sensor 102 to generate moving picture signals, so that the CCD sensor 102 converts the pictures focused by the optical lens 101 to electric signals. Then, the signal processing unit 103 converts the electric signals to digital signals, which become video signals. The video signals are then stored in the moving picture memory 107. While video signals in the compression process are transferred from the moving picture compressing unit 105 to the moving picture memory 107, the video signals are converted sequentially to compressed moving picture streams and audios collected by the microphone 110 are compressed in the audio compressing unit 111. After that, moving picture streams generated by the moving picture compressing unit 105 and compressed audio streams generated in the audio compressing unit 111 are multiplexed by the multiplexing unit 112. The multiplexed streams are recorded on the recording medium 114 via the recording control unit 113 in a predetermined recording format to be described later.

If the still picture photographing mode is selected by the switch 116, the system control unit 115 controls the whole system as follows. The driving unit 104 drives the CCD sensor 102 to generate still picture signals, so that the CCD sensor 102 converts the pictures focused by the optical lens 101 to electric signals, then the signal processing unit 103 converts the electric signals to digital signals, which become video signals. If the CCD sensor 102 is driven to generate still picture signals, fine video signals are output so that video signals for a sheet of still pictures are output in a time exceeding the one-frame period of moving picture signals. The still picture memory 108 stores video signals equivalent to one sheet of still pictures. After that, the fine still picture compressing unit 106 compresses still pictures for one sheet stored in the still picture memory 108 and the compressed still pictures are recorded on the recording medium 114 via the recording control unit 113 as still picture file data. Then, the signal converting unit 109 converts the signal format of a sheet of pictures stored in the still picture memory 108 to the same signal format as that of single frame moving picture signals, then the converted signals are stored in the moving picture memory 107. Then, the moving picture compressing unit 105 compresses signals to MPEG I pictures, etc., then the I pictures are stored on the recording medium 114 via the recording control unit 113 as moving picture streams.

According to this embodiment, therefore, when in photographing still pictures, still pictures in the format of the compressed moving picture streams converted from fine still pictures are recorded together with a fine still picture file. Those pictures can thus be reproduced in any of recordable players and other ordinary players for reproducing moving pictures. The same pictures can also be fetched as fine still pictures so as to be handled on personal computers.

Although signals read from the still picture memory 108 are converted in the signal converting unit 109 in this embodiment, fine video signals output from the signal processing unit 103 may also be converted directly in the signal converting unit 109. In this case, fine still picture signals and single frame moving picture image signals are stored in the still picture memory 108 and in the moving picture memory 107 simultaneously.

Furthermore, the moving picture memory 107 and the still picture memory 108 in this embodiment may be composed as different address spaces in one memory.

The signal converting unit 109 may also be composed so that the CPU obtains still pictures directly from the still picture memory 108 using a program and converts the still pictures to single frame moving pictures through an arithmetic operation, thereby writing the pictures in the moving picture memory 107 directly.

The moving picture compressing unit 105 and the fine still picture compressing unit 106 may also be composed respectively so that both units 105 and 106 can share a processing circuit for such processings as discrete cosine conversion and can switch the mode between moving picture image compression and fine still picture compression. In this case, it is only needed to change the mode between when recording a fine still picture file and when recording still pictures in the format of compressed moving picture streams converted from fine still pictures.

Figure 2:
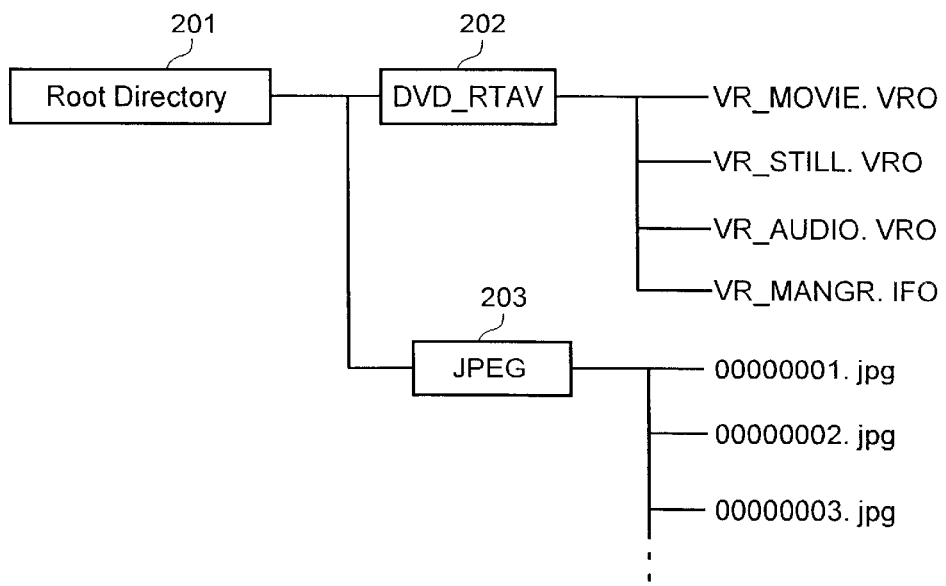
FIG. 2 is a recording format of a recording medium used for the recording apparatus united with a camera.

FIG. 2 shows an example of the recording file format for moving and still pictures in a video recording apparatus in this embodiment. In FIG. 2, numeral 201 is a root directory, which is the top hierarchical layer of the logic data file management structure on an optical disk, which is a recording medium. Numeral 202 is a data directory named as DVD_RTAV for recording data files of moving pictures (including multiplexed audios), still pictures, and audio data. The VR_MOVIE.VRO is a data file for storing moving pictures and the VR_STILL.VRO is a data file for recording still pictures, which are MPEG I pictures and compressed audio data. The VR_AUDIO.VRO is a data file for recording audio data when in after-recording of audios. The VR_MANGR. IFO is a management file indicating how data files are recorded in each of VR_MOVIE.VRO, VR_STILL.VRO, and VR_AUDIO.VRO files. Numeral 203 is a directory for recording other data files than the compressed moving pictures file. Although such a directory name as JPEG is picked up as an example in this embodiment, this directory name is not restricted at all and JPEG files may be recorded directly in the route directory without creating any JPEG file under the directory named as JPEG.

In the moving picture photographing mode, moving pictures are recorded in the VR_MOVIE.VRO file under the DVD_RTAV directory 202 shown in FIG. 2, as well as the management information in the management file VR_MANGR.IFO is rewritten. In the still picture photographing mode, still pictures, which are MPEG I pictures, are recorded in the VR_STILL.VRO file and the management information in the management file VR_MANGR.IFO is rewritten. In addition, a JPEG-compressed picture data file is recorded as 00000001.jpg under the JPEG directory 203, and each time still pictures are photographed, MPEG I picture still pictures are added in the VR_STILL.VRO file, as well as still pictures are recorded with a new file name sequentially as a serial number like 00000002.jpg each time still pictures are photographed.

Although file names are described as serial numbers like 00000001.jpg, 00000002.jpg, and the file extension is described as jpg in this embodiment, both file name and file extension are not restricted at all.

According to this embodiment, therefore, still pictures, which are MPEG I pictures, converted from fine still pictures, as well as a JPEG fine still pictures file are recorded when still pictures are photographed, so it is possible to reproduce those still pictures even in any of recordable players and other ordinary players which reproduce moving pictures. In addition, the same pictures can be taken out as JPEG fine still pictures and handled on personal computers, etc.

Second Embodiment

Figure 3:
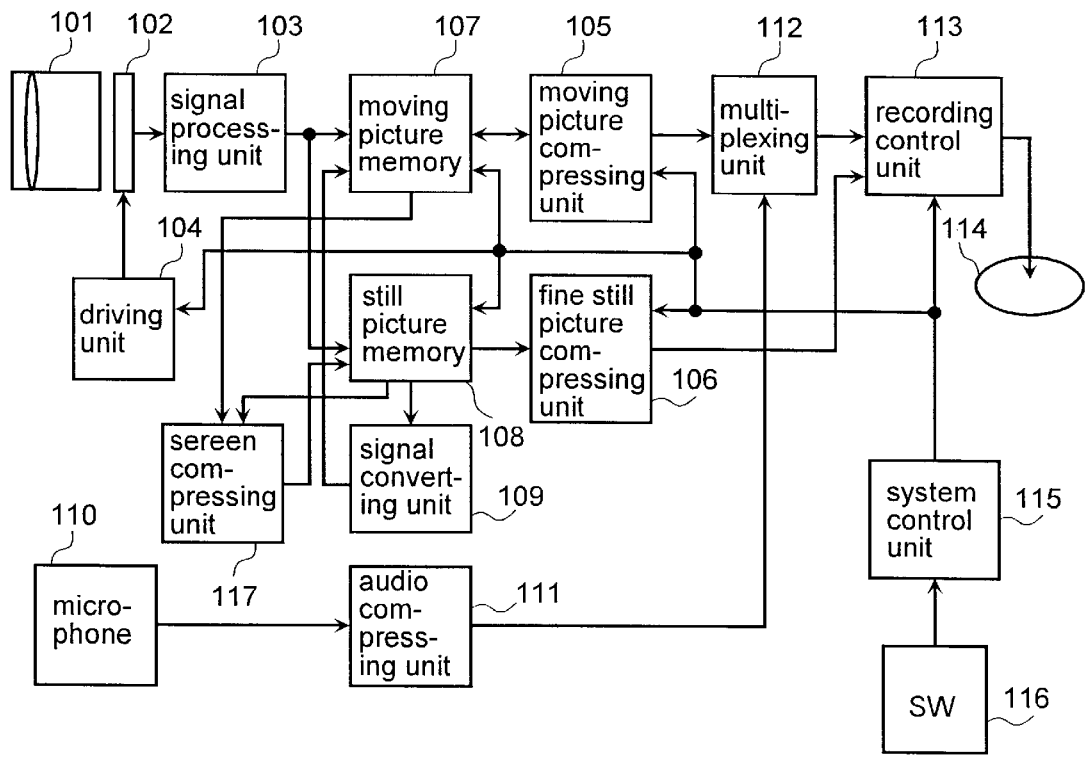
FIG. 3 is a system block diagram of a recording apparatus united with a camera in another embodiment of the video recording apparatus of the present invention.

FIG. 3 is a system block diagram indicating an embodiment of a recording apparatus united with a camera used as a video recording apparatus of the present invention. In this embodiment, a compressed screen displayed for searching pictures, that is, thumb nail pictures, are also recorded when in reproducing pictures. In FIG. 2, numeral 101 is an optical lens for focusing pictures and 102 is a CCD sensor, which is photoelectric converting means for converting the light on focused pictures to electric signals. Numeral 103 is a signal processing unit for converting picture information converted to electric signals further to video signals and 104 is a driving unit for driving the CCD sensor 102. Numeral 105 is a moving picture compressing unit for compressing video signals in accordance with such a moving picture encoding standard as MPEG. Numeral 106 is a fine still picture compressing unit for compressing video signals in accordance with such a fine still picture encoding standard as JPEG and 107 is a moving picture memory for storing pictures temporarily when the moving picture compressing unit 105 performs a compression processing and 108 is a still picture memory for storing pictures temporarily when the fine still picture compressing unit 106 performs a compression processing. Numeral 109 is a signal converting unit for converting the signal format of fine still picture signals to the same signal format as that of single frame moving picture signals and 110 is a microphone for converting collected audios to electric audio signals. Numeral 111 is an audio compressing unit for converting audio signals to digital signals and compressing predetermined digital audios. Numeral 112 is a multiplexing unit for multiplexing compressed moving picture streams generated in the moving picture compressing unit 105 and compressed audio streams generated in the audio compressing unit 111. Numeral 113 is a recording control unit for managing recording of moving and still pictures in data files and controlling the recording with the use of a predetermined file system. Numeral 114 is such a recording medium as an optical disk, etc. Numeral 115 is a system control unit for controlling the driving unit 104, the moving picture compressing unit 105, the fine still picture compressing unit 106, the moving picture memory 107, the still picture memory 108, and the recording control unit 113 one-dimensionally. Numeral 116 is a switch used by the user to select the recording mode between moving picture photographing and still picture photographing. The configurations and operations of those items are the same as those in the first embodiment shown in FIG. 1. Numeral 117 is a screen compressing unit for creating thumb nail pictures by compressing the screen of moving pictures or fine still pictures.

While the moving picture photographing mode is selected by the switch 116, the compressed moving streams generated in the moving picture compressing unit 105 and the compressed audio streams generated in the audio compressing unit 111 are multiplexed and recorded on the recording medium 114 just like in the first embodiment. At the same time, pictures of a frame representing object moving pictures, for example, the start frame picture, is read from the moving picture memory 107, then the screen is compressed by the screen compressing unit 117 and the pictures are stored in the still picture memory 108. In this case, it is premised that the size of the compressed screen is a thumb nail size, for example, 160 pixels in the horizontal direction and 120 pixels in the vertical direction. When recording of moving pictures is ended, the fine still picture compressing unit 106 compresses the thumb nail pictures stored in the still picture memory 108 and records the pictures as thumb nail file data on the recording medium 114. The thumb nail file data differs from any of moving picture stream data and still picture file data.

If the still picture photographing mode is selected by the switch 116, at first, still picture file data generated in the fine still picture compressing unit 106 are recorded on the recording medium 114 together with still pictures in the compressed moving picture stream format generated in the moving picture compressing unit 105 just like in the first embodiment. Then, fine still pictures are read from the still picture memory 108. After that, the screen is compressed by the screen compressing unit 117 and the read fine still pictures are stored again in the still picture memory 108. At this time, the size of the compressed screen is a thumb nail size, for example, 160 pixels in the horizontal direction and 120 pixels in the vertical direction. After that, the thumb nail pictures stored in the still picture memory 108 are compressed in the fine still picture compressing unit 106, then recorded on the recording medium 114 as thumb nail file data, which is different from any of moving picture stream data and still picture file data.

According to this embodiment, because the same compressed pictures as representative moving pictures or still pictures are recorded when in photographing of moving pictures and still pictures, it is possible to display such screens as the searching screen including this compressed pictures quickly when in reproducing so as to make it easier for the user to control the apparatus.

In the above embodiment, if the still picture photographing mode is selected by the switch 116, then still pictures whose signal format is converted to the same one as that of single frame moving picture signals are read from the moving picture memory 107 and stored in the still picture memory 108 after the screen is compressed by the screen compressing unit 117. After that, it is possible to compress still pictures in the fine still picture compressing unit 106 and record them on the recording medium 114 as thumb nail file data.

It is also possible to read either of the fine still pictures stored in the still picture memory 108 or the still pictures whose signal format is changed to the same one as that of the single frame moving picture image signals stored in the moving picture memory 107, then store them in the still picture memory 108 after the screen is compressed by the screen compressing unit 117, and then compress the still pictures in the fine still picture compressing unit 106 and record them on the recording medium 114 as thumb nail file data.

According to this embodiment, because the same compressed pictures as representative moving pictures or still pictures are recorded when in photographing of moving pictures and still pictures, it is possible to display such screens as the searching screen including this compressed pictures quickly when in reproducing so as to make it easier for the user to control the apparatus.

Because the signal converting unit 109 and the screen compressing unit 117 are similar in processing contents, they may be united into a processing unit.

The screen compressing unit 117 may be composed so that the CPU obtains moving or still pictures from the moving picture memory 107 or the still picture memory 108 using a program and compresses the pictures through an arithmetic operation, then writes the compressed pictures in the still picture memory 108 directly.

Although thumb nail pictures are encoded by the fine still picture compressing unit 106 in this embodiment, the pictures may be encoded with another different encoding method.

Thumb nail pictures may also be encoded by the CPU through an arithmetic operation. In this case, the CPU obtains thumb nail pictures directly from the still picture memory 108 using a program, then writes the encoded pictures in a buffer memory disposed in the not-illustrated rear stage (the multiplexing unit 112 or the recording control unit 113).

Figure 4:
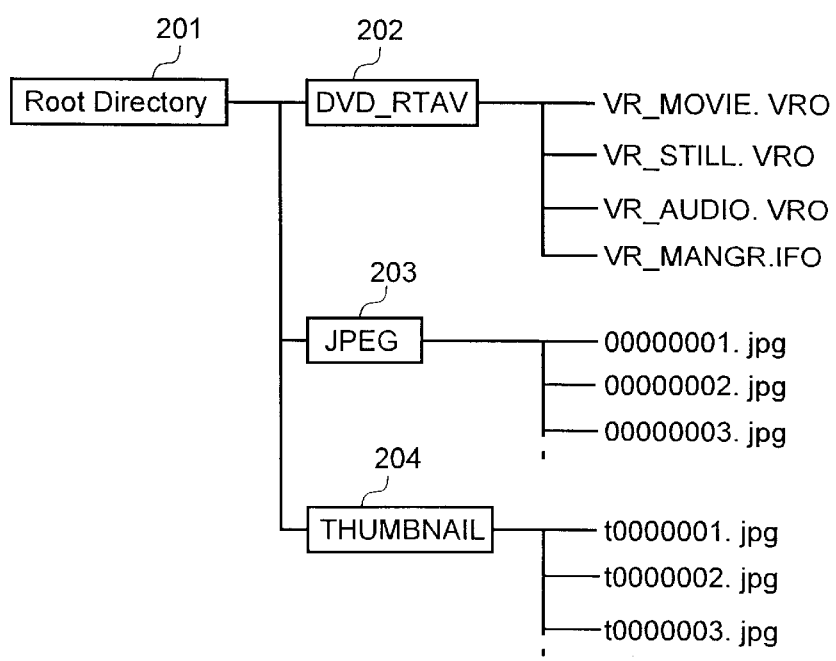
FIG. 4 is a recording format of a recording medium used for the recording apparatus united with a camera.

FIG. 4 shows an example of the file format for recording moving pictures, still pictures, and thumb nail pictures in the video recording apparatus of this embodiment. In FIG. 4, numeral 201 is a root directory, which is the top hierarchical layer of the logic data file management structure on an optical disk, which is a recording medium. Numeral 202 is a directory named as DVD_RTAV used to record data files for moving pictures (including multiplexed audios), still pictures, and audio data. Numeral 203 is a directory for recording JPEG data files for storing compressed still pictures. The contents in the files are the same as those in each file in the file format shown in FIG. 2. Numeral 204 is a directory for recording data files containing compressed thumb nail pictures respectively. Although THUMBNAIL is used as a directory name as an example in this embodiment, this directory name is not restricted at all; a data file containing compressed thumb nail pictures may be placed directly in the root directory. Furthermore, although moving picture thumb nail and still picture thumb nail are not separated in different directories in this embodiment, they may be separated in different directories.

In the moving picture photographing mode, moving pictures are recorded in the VR_MOVIE.VRO file under the DVD_RTAV directory 202 shown in FIG. 4, as well as the management information in the management file VR_MANGR.IFO is rewritten. Furthermore, a thumb nail picture file containing JPEG-compressed data is recorded with a file name of t0000001.jpg under the THUMBNAIL directory 204. In the still picture photographing mode, MPEG I-picture still pictures are recorded in the VR_STILL.VRO file and the management information in the management file VR_MANGR.IFO is rewritten, as well as a fine still picture data file containing JPEG-compressed data is recorded with a file name of 00000001.jpg under the JPEG directory 203, and furthermore, the thumb nail picture data file containing JPEG-compressed data is recorded with a file name of t0000002.jpg under the THUMBNAIL directory 204. After that, each time moving or still pictures are photographed, the pictures are recorded with a file name sequentially as a serial number like t0000003.jpg under the THUMBNAIL directory 204.

Although both fine still pictures and thumb nail pictures are recorded in a JPEG data file respectively in this embodiment, both fine still and thumb nail pictures may be recorded in any file format and in any different file formats.

Although serial numbers are used as file names, for example, like t0000001.jpg, t0000002.jpg, and jpg is used as the file extension in this embodiment, the file names and the file extension are not limited only to them.

According to this embodiment, because the same compressed pictures as representative moving pictures or still pictures are recorded when in photographing of moving pictures and still pictures, it is possible to display such screens as the searching screen including this compressed pictures quickly when in reproducing so as to make it easier for the user to control the apparatus.

Third Embodiment

Figure 5:
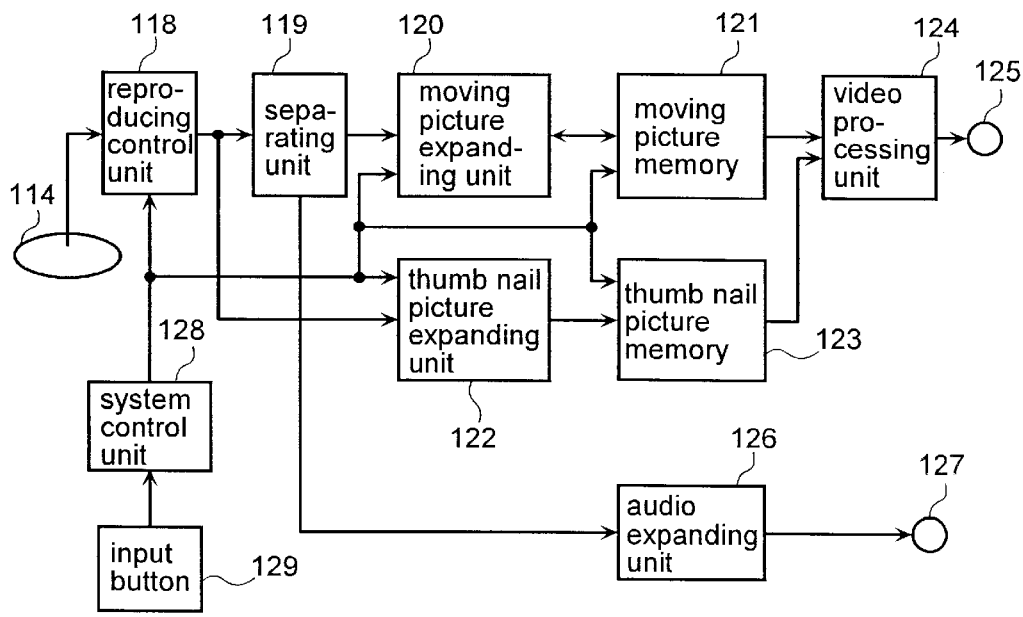
FIG. 5 is a system block diagram of a video reproducing apparatus in an embodiment of the present invention.

FIG. 5 is a system block diagram indicating an embodiment of the video reproducing apparatus of the present invention. In this embodiment, pictures are reproduced from a recording medium on which the pictures are recorded by the video recording apparatus of the present invention. In FIG. 5, numeral 114 is such a recording medium as an optical disk, and the like. Numeral 118 is a reproducing control unit for managing data files of both moving and still pictures to be reproduced and controlling the reproduction of those pictures with the use of a predetermined file system. Numeral 119 is a separating unit for separating compressed moving streams from compressed audio streams and transmitting separated streams to the moving picture expanding unit 120 and the audio expanding unit 126 respectively. Numeral 120 is a moving picture expanding unit for expanding compressed moving picture streams or a compressed still picture data file to restore original video signals in accordance with such a moving picture encoding standard as MPEG. Numeral 121 is a moving picture memory for storing pictures temporarily when the moving picture expanding unit 120 expands pictures. Numeral 122 is a thumb nail picture expanding unit for expanding compressed thumb nail pictures to restore original thumb nail pictures in accordance with such an encoding standard as JPEG. Numeral 123 is a thumb nail picture memory for storing pictures temporarily when the thumb nail picture expanding unit 122 expands pictures. Numeral 124 is a video processing unit for converting restored moving, still, or thumb nail pictures to video signals. Numeral 125 is a video output terminal connected to an external display apparatus or recording apparatus for displaying moving pictures and used to output moving, still, or thumb nail pictures in a moving picture signal format. Numeral 126 is an audio expanding unit for expanding audio streams compressed with a predetermined digital audio compression method to restore original audio signals. Numeral 127 is an audio output terminal for outputting restored audio signals and 128 is a system control unit for controlling the reproducing control unit 118, the moving picture expanding unit 120, the moving picture memory 121, the thumb nail picture expanding unit 122, and the thumb nail picture memory 123 one-dimensionally. Numeral 129 is such input buttons as a cursor button and a decision button used by the user to select an object picture from thumb nail pictures displayed on the screen.

The recording medium 114 contains moving, still, and thumb nail pictures recorded in the file format shown in FIG. 4. If pictures are reproduced from the recording medium 114, the system control unit 128 controls the whole system as follows to display a list of thumb nail pictures. The reproducing control unit 118 reproduces the thumb nail data files recorded on the recording medium 114 sequentially, then the thumb nail picture expanding unit 122 expands each of those thumb nail data files and lists up those files in the thumb nail picture memory 123. The list of the thumb nail data files created in the thumb nail picture memory 123 is then output from the video output terminal 125 via the video processing unit 124 and displayed on an external display apparatus connected to the terminal. Then, the user selects an object picture from the list of the thumb nail pictures with the use of the input buttons 129.

If a moving image is selected, the system control unit 128 controls the whole system as follows. The reproducing control unit 118 reproduces a moving picture data file corresponding to the selected thumb nail, then the separating unit 119 separates compressed moving picture streams from compressed audio streams. The compressed moving picture streams are converted to video signals sequentially, while the moving picture expanding unit 120 transfers the video signals to the moving picture memory 121. The video signals are then read from the moving picture memory 121 and output from the video output terminal 125 via the video processing unit 124. The compressed audio streams are expanded in the audio expanding unit 126 and output from the audio output terminal 127.

If a still picture is selected, the system control unit 128 controls the whole system as follows. The reproducing control unit 118 reproduces a data file in such a compressed moving picture stream format as the MPEG I-picture one. The data file is selected from two types of still picture data files corresponding to the selected thumb nail. Then, the moving picture expanding unit 120 restores the reproduced data file to still pictures in the same signal format as that of the single-frame moving picture signals and stores the picture in the moving picture memory 121. The still pictures are then read repetitively from the moving picture memory 121 and output from the video output terminal 125 via the video processing unit 124.

According to this embodiment, therefore, when a still picture thumb nail is selected to display a still picture, a data file in the compressed moving picture stream format is selected from two types of still picture data files corresponding to the thumb nail so as to be reproduced and output from the video output terminal in the moving picture format. It is thus possible to omit the signal converting circuit for converting the format of the fine still picture signals to the same signal format as that of the single frame moving picture signals, thereby the apparatus circuit is simplified. Furthermore, if no fine still picture signal is output as described in this embodiment, the fine still picture expanding circuit can also be omitted.

If the output destination is an apparatus for outputting fine still picture signals, a fine still picture data file selected from two types of still picture data files corresponding to the selected thumb nail may be output, of course. The output file may be selected such way according to the resolution of the destination apparatus.

Fourth Embodiment

Figure 6:
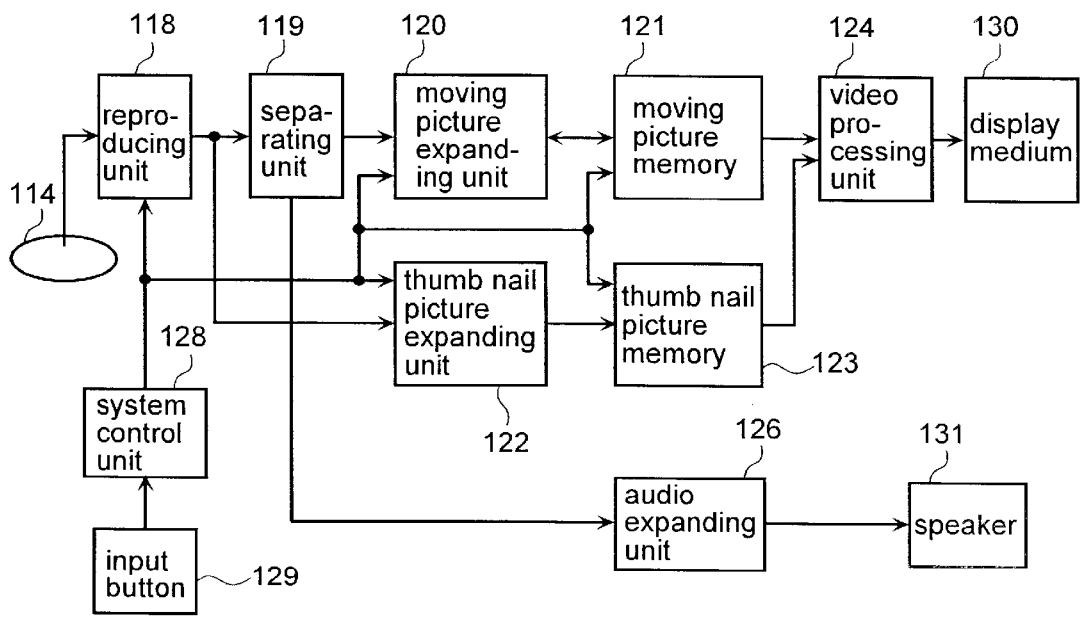
FIG. 6 is a system block diagram of the video reproducing apparatus in another embodiment of the present invention.

FIG. 6 is a system block diagram indicating an embodiment of the video reproducing apparatus of the present invention. In this embodiment, the video reproducing apparatus can incorporate such a display medium as a liquid crystal panel in itself so as to display reproduced moving, still, and thumb nail pictures. In FIG. 6, numeral 114 is such a recording medium as an optical disk, etc. Numeral 118 is a reproducing control unit for managing data files of both moving and still pictures to be reproduced and controlling the reproduction of those pictures with the use of a predetermined file system. Numeral 119 is a separating unit for separating compressed moving streams from compressed audio streams and transmitting separated streams to the moving picture expanding unit 120 and the audio expanding unit 126 respectively. Numeral 120 is a moving picture expanding unit for expanding compressed moving picture streams or a compressed still picture data file to restore original video signals in accordance with such a moving picture encoding standard as MPEG. Numeral 121 is a moving picture memory for storing pictures temporarily when the moving picture expanding unit 120 expands pictures. Numeral 122 is a thumb nail picture expanding unit for expanding compressed thumb nail pictures to restore original thumb nail pictures in accordance with such an encoding standard as JPEG. Numeral 123 is a thumb nail picture memory for storing pictures temporarily when the thumb nail picture expanding unit 122 expands pictures. Numeral 124 is a video processing unit for converting restored moving, still, or thumb nail pictures to video signals. Numeral 126 is an audio expanding unit for expanding audio streams compressed with a predetermined digital audio compression method to restore original audio signals. Numeral 128 is a system control unit for controlling the reproducing control unit 118, the moving picture expanding unit 120, the moving picture memory 121, the thumb nail picture expanding unit 122, and the thumb nail picture memory 123 one-dimensionally. Numeral 129 is such input buttons as a cursor button and a decision button used by the user to select an object picture from thumb nail pictures displayed on the screen. The configurations and operations of those items are the same as those in the third embodiment shown in FIG. 5. Numeral 130 is such a display medium as a liquid crystal panel for displaying reproduced moving, still, and thumb nail pictures and 131 is a speaker for sounding reproduced audios.

If pictures are reproduced from the recording medium 114 just like in the third embodiment, a list of thumb nail pictures is created and displayed on the display medium 130. Then, the user selects an object picture from the list of the thumb nail pictures with the use of the input buttons 131.

If a moving image is selected, a moving picture data file corresponding to the selected thumb nail is reproduced and displayed on the display medium 130 just like in the third embodiment. The audios are sounded from the speaker 131.

If a still picture is selected, a data file in such a compressed moving picture stream format as the MPEG I-picture one is selected from two types of still picture data files corresponding to the selected thumb nail just like in the third embodiment. Then, the reproduced data file is displayed on the display medium 130.

According to this embodiment, therefore, when a still picture thumb nail is selected to display a still picture, a data file in the compressed moving picture stream format is selected from two types of still picture data files corresponding to the thumb nail so as to be reproduced and output from the video output terminal set in the moving picture format. It is thus possible to omit the signal converting circuit for converting the format of the fine still picture signals to the same signal format as that of the single frame moving picture signals, thereby the apparatus circuit is simplified. Furthermore, if no fine still picture signal is output as described in this embodiment, the fine still picture expanding circuit can also be omitted.

If the output destination is an apparatus for outputting fine still picture signals, a fine still picture data file selected from two types of still picture data files corresponding to the selected thumb nail may be output, of course. The output file may be selected such way according to the resolution of the destination apparatus.

As described above, according to the present invention, therefore, fine frame moving pictures converted from fine still pictures, as well as a fine still picture data file can be recorded when in photographing still pictures. For example, pictures can be reproduced even by any of recordable players for reproducing such moving pictures as MPEG ones and other ordinary players. Furthermore, photographed still pictures can be handled as fine still pictures even on personal computers.

According to this embodiment, because the same compressed pictures as representative moving pictures or still pictures are recorded when in photographing of moving pictures and still pictures, it is possible to display such screens as the searching screen including this compressed pictures quickly when in reproducing so as to make it easier for the user to control the apparatus.

Furthermore, if a still picture thumb nail is selected to display a still picture when in reproducing, a data file in the compressed moving picture stream format is selected from two types of still picture data files so as to be reproduced and output from the video output terminal set in the moving picture format. It is thus possible to omit the signal converting circuit for converting the format of the fine still picture signals to the same signal format as that of the single frame moving picture signals, thereby the apparatus circuit is simplified. Furthermore, if no fine still picture signal is output as described in this embodiment, the fine still picture expanding circuit can also be omitted.

What is claimed is:

1. A recording method used for a video recording apparatus that can record both moving and still pictures on a recording medium, wherein
    moving pictures encoded by first encoding method are recorded when in recording moving pictures and still pictures encoded by second encoding method and other still pictures encoded by said first encoding method from single frame signals obtained from said still pictures are recorded when in recording still pictures.

2. A recording method in accordance with claim 1, wherein
    said first encoding method uses the MPEG standard and said second encoding method uses the JPEG standard.

3. A video recording apparatus, comprising:
    optical focusing means composed of an optical lens system;
    photoelectric converting means for converting pictures focused by said optical focusing means to electric signals;
    signal processing means for converting electric signals converted by said photoelectric converting means to video signals and outputting said video signals;
    driving means provided with two photographing modes for moving pictures and still pictures and used to drive reading of electric signals from said photoelectric converting means in said moving photographing mode so as to convert said video signals to predetermined moving picture signals and drive reading of electric signals from said photoelectric converting means in said still picture photographing mode so as to convert said video signals to video signals finer than said moving picture signals;

selecting means for selecting either said moving or still picture photographing mode;

signal converting means for converting the signal format of fine video signals to the same signal format as that of single frame moving picture signals in said moving photographing mode when said still picture photographing mode is selected and outputting said converted signals;

moving picture encoding means for encoding moving picture signals output from said signal processing means using said first encoding method when in recording moving pictures and encoding single frame signals output from said signal converting means using said first encoding method when in recording still pictures;

still picture encoding means for encoding fine video signals using said second encoding method when in recording still pictures;

recording controlling means for controlling recording of encoded moving and still pictures on said recording medium;

recording controlling means for recording moving pictures encoded by said moving picture encoding means when in recording moving pictures and recording still pictures encoded by said still picture encoding means and other still pictures encoded to single frame signals by said moving picture encoding means on said recording medium when in recording still pictures; and system controlling means for controlling each of said means one-dimensionally.

4. A video recording apparatus in accordance with claim 3; wherein said apparatus further includes;

moving picture storing means for storing moving picture signals output from said signal processing means when said moving picture photographing mode is selected and storing single frame signals output from said signal converting means when said still picture photographing mode is selected; and still picture storing means for storing fine video signals; and said moving picture encoding means reads and encodes moving picture signals stored in said moving picture storing means when moving pictures are to be recorded and reads and encodes said single frame signals stored in said moving picture storing means; and said still picture encoding means reads and encodes fine video signals stored in said still picture storing means.

5. A recording method in accordance with claim 1; wherein a still picture obtained by compressing signals of a frame representing object moving pictures to record is also recorded when in recording moving pictures and still pictures obtained by compressing object still pictures to record are also recorded when in recording still pictures.

6. A recording method in accordance with claim 1; wherein a still picture obtained by compressing signals of a frame representing object moving pictures to record is also recorded when in recording moving pictures and still pictures compressed by said first encoding method from single frame signals to be encoded are also recorded when in recording still pictures.

7. A recording method in accordance with claim 1; wherein a still picture obtained by compressing signals of a frame representing object moving pictures to record is also recorded when in recording moving pictures and, when in recording still pictures, object still pictures are created by compressing either object still pictures to record or single frame signals to be encoded by said first encoding method.

8. A video recording apparatus in accordance with claim 4; wherein said apparatus further includes;

screen compressing means for compressing the screen of a frame picture representing moving picture signals stored in said moving picture storing means when said moving photographing mode is selected and compressing the screen of fine video signals stored in said still picture storing means when said still picture photographing mode is selected; and said recording controlling means records moving pictures encoded by said moving picture encoding means and still pictures whose screen is compressed by said screen compressing means when in recording moving pictures and records still pictures encoded by said still picture encoding means, other still pictures encoded by said moving picture encoding means from single frame signals obtained from said still pictures, and further other still pictures whose screen is compressed by said screen compressing means when in recording still pictures.

9. A video recording apparatus in accordance with claim 4; wherein said apparatus further includes;

screen compressing means for compressing the screen of a frame picture representing moving picture signals stored in said moving picture storing means when said moving photographing mode is selected and compressing the screen of single frame signals stored in said moving picture storing means when said still picture photographing mode is selected; and said recording controlling means records moving pictures encoded by said moving picture encoding means and still pictures whose screen is compressed by said screen compressing means when in recording moving pictures and records still pictures encoded by said still picture encoding means, other still pictures encoded by said moving picture encoding means from single frame signals obtained from said still pictures, and further other still pictures whose screen is compressed by said screen compressing means when in recording still pictures.

10. A video recording apparatus in accordance with claim 4; wherein said apparatus further includes;

screen compressing means for compressing the screen of a frame picture representing moving picture signals stored in said moving picture storing means when said moving photographing mode is selected and compressing the screen of either fine video signals stored in said still picture storing means or single frame signals stored in said moving picture storing means when said still picture photographing mode is selected; and said recording controlling means records moving pictures encoded by said moving picture encoding means and still pictures whose screen is compressed by said screen compressing means when in recording moving pictures and records still pictures encoded by said still picture encoding means, other still pictures encoded by said moving picture encoding means from single frame signals obtained from said still pictures, and further other still pictures whose screen is compressed by said screen compressing means when in recording still pictures.

11. A recording medium for recording;

moving pictures encoded by first encoding method;

first still pictures obtained by compressing the screen of a picture representing said moving pictures;

second still pictures encoded by second encoding method;

third still pictures encoded by said first encoding method from single frame signals obtained from said second still pictures; and fourth still pictures obtained by compressing the screen of at least either said second still pictures or said third still pictures.

12. A video reproducing method that can reproduce a recording medium in accordance with claim 11 and output pictures recorded on said recording medium; wherein said third still pictures are reproduced and output to at least one output destination when one of a plurality of said fourth still pictures is selected and called.

13. A video reproducing method that can reproduce said recording medium in accordance with claim 11 and output pictures recorded on said recording medium; wherein when one of said fourth still pictures is selected and called, said output destination selects, reproduces, and outputs a second or third still picture corresponding to said called still picture according to a picture resolution that can cope with the still picture.

14. A video reproducing method that can reproduce a recording medium in accordance with claim 11; wherein when one of said fourth still pictures is selected and called, said third still picture corresponding to said selected still picture is reproduced and displayed.

15. A video reproducing apparatus that can reproduce a recording medium in accordance with claim 11 and output pictures recorded on said recording medium; wherein said apparatus further includes;

reproducing means for reproducing a plurality of said first and/or fourth still pictures;

picture selecting means that can select a still picture from a plurality of said first and/or fourth still pictures;

reproducing controlling means for reproducing said third still picture corresponding to said selected still picture when said selected still picture is said fourth still picture;

moving picture decoding means for decoding said reproduced third still pictures using said first encoding method; and an output terminal for outputting said decoded third still pictures.

16. A video reproducing apparatus that can reproduce a recording medium in accordance with claim 11; wherein said apparatus further includes;

reproducing means for reproducing a plurality of said first and/or fourth still pictures;

picture selecting means that can select a still picture from a plurality of said first and/or fourth still pictures;

reproducing controlling means for reproducing said third still picture corresponding to said selected still picture when said selected still picture is said fourth still picture;

moving picture decoding means for decoding said reproduced third still pictures using said first encoding method; and displaying means for displaying said decoded third still pictures.

* * * * *